United States Patent [19]
Miyauchi

[11] Patent Number: 5,801,882
[45] Date of Patent: Sep. 1, 1998

[54] REAL IMAGE MODE FINDER OPTICAL SYSTEM

[75] Inventor: Yuji Miyauchi, Hachioji, Japan

[73] Assignee: Olympus Optical Company, Ltd., Tokyo, Japan

[21] Appl. No.: 868,576

[22] Filed: Jun. 4, 1997

Related U.S. Application Data

[63] Continuation of Ser. No. 328,530, Oct. 25, 1994, abandoned.

[30] Foreign Application Priority Data

Oct. 28, 1993 [JP] Japan ............................ 5-270506
Mar. 17, 1994 [JP] Japan ............................ 6-047186

[51] Int. Cl.$^6$ ............................ G02B 23/00; G02B 5/04
[52] U.S. Cl. ............................ 359/431; 359/432; 359/834; 359/837
[58] Field of Search ............................ 359/362, 421–423, 359/431–435, 618, 629, 636–640, 831, 833–837; 354/199, 202, 166, 219–225, 476–480; 396/373–386, 268–274

[56] References Cited

U.S. PATENT DOCUMENTS

| | | | |
|---|---|---|---|
| 4,910,545 | 3/1990 | Fujibayashi et al. | 396/386 |
| 4,941,012 | 7/1990 | Inabata | 354/478 |
| 4,947,198 | 8/1990 | Inanobe et al. | 354/225 |
| 5,126,549 | 6/1992 | Yamada | 359/407 |
| 5,231,534 | 7/1993 | Kato | 359/431 |
| 5,668,919 | 9/1997 | Ito | 396/268 |

FOREIGN PATENT DOCUMENTS

| | | | |
|---|---|---|---|
| 56605 | 3/1988 | Japan | 359/838 |
| 2-10335 | 1/1990 | Japan . | |
| 2-29723 | 1/1990 | Japan . | |
| 109029 | 4/1990 | Japan | 354/224 |
| 4-70719 | 3/1992 | Japan . | |
| 4230719 | 8/1992 | Japan . | |

Primary Examiner—Thong Nguyen
Attorney, Agent, or Firm—Cushman Darby & Cushman IP Group of Pillsbury Madison & Sutro LLP

[57] ABSTRACT

A real image mode finder optical system, situated separate from a photographing optical system, includes an objective system for forming an object image; an optical path splitting member for dividing a finder optical path formed by the objective system into a reflecting optical path and a transmitting optical path; a prism member whose refractive index is greater than 1, disposed on at least one of a surface on the reflection side and a surface on the transmission side of the optical path splitting member; a photometric member disposed on the reflecting optical path; and an eyepiece system situated on the transmitting optical path and disposed behind the optical path splitting member and the prism member. In this way, the real image mode finder optical system having a function for photometry keeps the number of parts to a minimum.

19 Claims, 7 Drawing Sheets

REAL IMAGE MODE FINDER OPTICAL SYSTEM

This is a Continuation of application Ser. No. 08/328, 530, filed on Oct. 25, 1994, which was abandoned.

BACKGROUND OF THE INVENTION

1. Field of the Invention

This invention relates to a real image mode finder optical system having a photometric function which is used in cameras for photography with silver halide or video cameras, and which is constructed to be independent of a photographing optical system.

2. Description of the Related Art

In general, most finder optical systems for use in compact cameras, video cameras, and electronic cameras have any one of Albada, inverse Galilean, and Keplerian (real image) type optical systems. Where these finder optical systems are used, each of photometric optical systems is often constructed as an optical system disposed to be independent of the finder optical system and the photographing optical system. In recent years, photographic lenses with the function of varying magnification have come to be mounted in compact cameras as well, and for cameras using such photographic lenses, it is required to bring about accurate photometric information.

In conventional photometric techniques, however, the ratio of a photometric area to a photographing area varies whenever the magnification of the photographic lens is changed, and thus a proper photometric area cannot be obtained. This makes it difficult to secure accurate photometric information.

In order to solve this problem, a photometric technique of dividing a beam of light of a real image mode finder to use part for photometry is well known. According to this technique, area is brought about such that the ratio a photometric real image mode well known the photometric of the photometric area to the photographing area is constant, irrespective of a magnification change of the photographic lens, and therefore accurate photometric information can be secured. Moreover, an advantage is that even when the magnification of the photographing optical system is fixed, photometric information corresponding to the image plane of the finder can easily be obtained.

Such photometric techniques are set forth in U.S. Pat. No. 4,941,012 proposed by the applicant of the present application and Japanese Patent Preliminary Publication Nos. Hei 2-10335 and Hei 4-70719. These are characterized in that a reflecting surface for erecting a finder image is also used as an optical path splitting means, and a beam of light transmitted through the optical path splitting means is used for photometry. The photometric techniques, however, have a problem in that when a photometric element or a photometric optical system is disposed in a camera, the number of degrees of freedom is limited because the reflecting surface for erecting the image is combined with the optical path splitting means.

SUMMARY OF THE INVENTION

An object of the present invention is to provide a real image mode finder optical system having a photometric function in which an optical path splitting means is provided in a finder optical path and is disposed such that it is independent of a reflecting surface for erecting an image so that one beam of light transmitted through the optical path splitting means is used to form a field image and the other beam of light reflected by the optical path splitting means is used for photometry, whereby when a photometric element or a photometric optical system is disposed in a camera, the number of degrees of freedom is increased and at the same time, the number of parts of optical system is kept to a minimum, with a simple arrangement.

In order to achieve the above object, the real image finder optical system of the present invention (a finder optical path of which is formed independent of a photographing optical path formed by a photographing optical system) comprises an objective system for forming an object image; an optical path splitting means for dividing the finder optical path formed by the objective system into a reflecting optical path and a transmitting optical path; a prism means whose refractive index (n) is greater than 1 (n>1) provided on at least one of a surface on the reflection side and a surface on the transmission side of the optical path splitting means; a photometric means situated on the reflecting optical path; and an eyepiece system situated on the transmitting optical path and disposed behind the optical path splitting means and the prism means. The finder optical system further comprises reflecting means having a plurality of reflecting surfaces for erecting the object image formed by the objective system between the objective system and the eyepiece system.

Further, the real image mode finder optical system of the present invention includes an objective system for forming an object image; a reflecting means having a plurality of reflecting surfaces for erecting the object image formed by the objective system; an eyepiece system for forming an exit pupil from a beam of light reflected by the reflecting means; an optical path splitting means disposed such that it is independent of the reflecting surfaces of the reflecting means, between the objective system and the eyepiece system, for dividing the finder optical path into a reflecting optical path and a transmitting optical path so that the eyepiece system is located on the transmitting optical path; and photometric means disposed on the reflecting optical path.

Still further, the real image finder optical system of the present invention includes an objective system; an eyepiece system; a field frame situated adjacent to an object image formed by the objective system; an optical path splitting means disposed between the objective system and the eyepiece system, for dividing the finder optical path into a reflecting optical path and a transmitting optical path; and a photometric means, so that the eyepiece system is disposed on the transmitting optical path and the photometric means is disposed on the reflecting optical path.

Hence, since the optical system of the present invention is constructed so that the optical path splitting means is disposed such that it is independent of the reflecting surfaces for erecting the image, the optical path splitting means can be incorporated in the finder optical system, even where various members are situated near the reflecting surfaces and it is difficult to arrange the optical path splitting means and the photometric optical system. Consequently, when the photometric element or the photometric optical system is disposed in a camera, the number of degrees of freedom is larger than that of the prior art.

Where the length of the finder optical system in its axial direction is limited, the optical path splitting means is located between the first and fourth reflecting surfaces for inverting the image, and thereby the finder optical system can be provided in the camera without being extended in the axial direction.

DETAILED DESCRIPTION OF THE PREFERRED EMBODIMENTS

In accordance with the embodiments shown in the drawings, the present invention will be explained in detail below.

Figure 1:
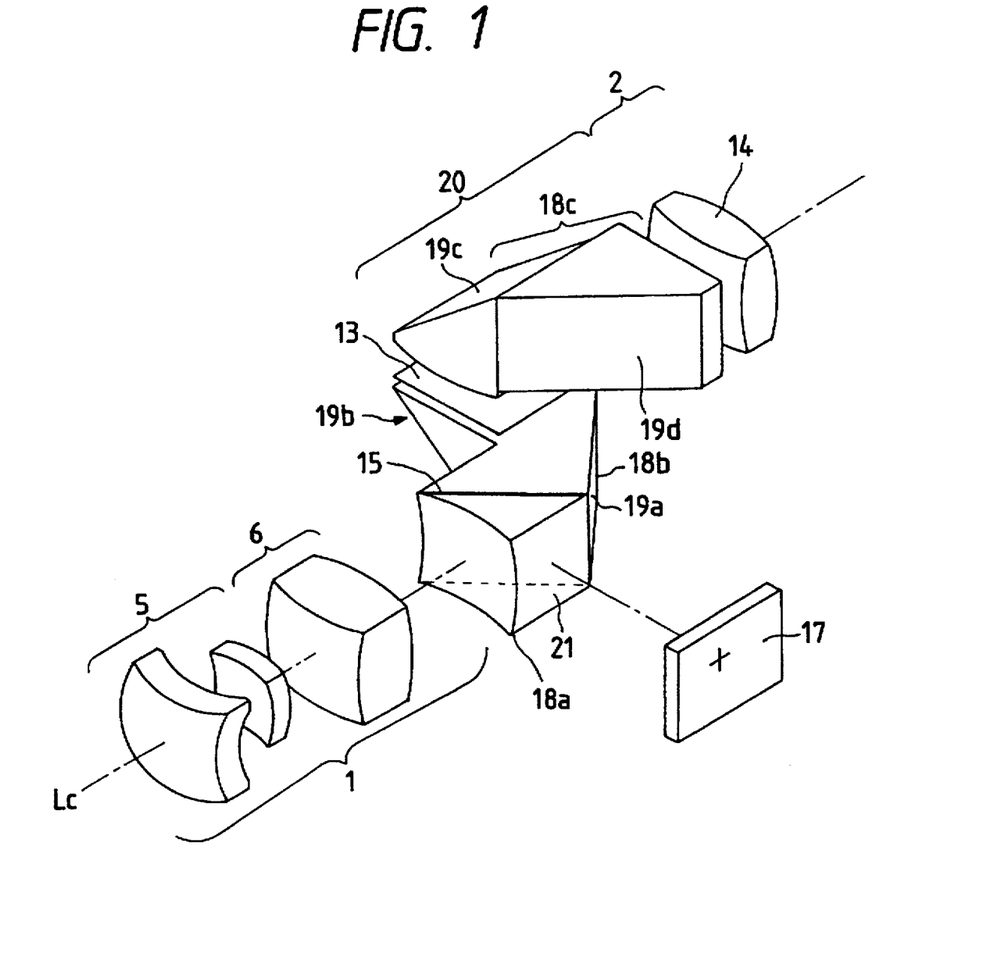
FIG. 1 is a perspective view showing the arrangement of a first embodiment of the real image mode finder optical system according to the present invention.
Figures 2A, 2B, 2C:
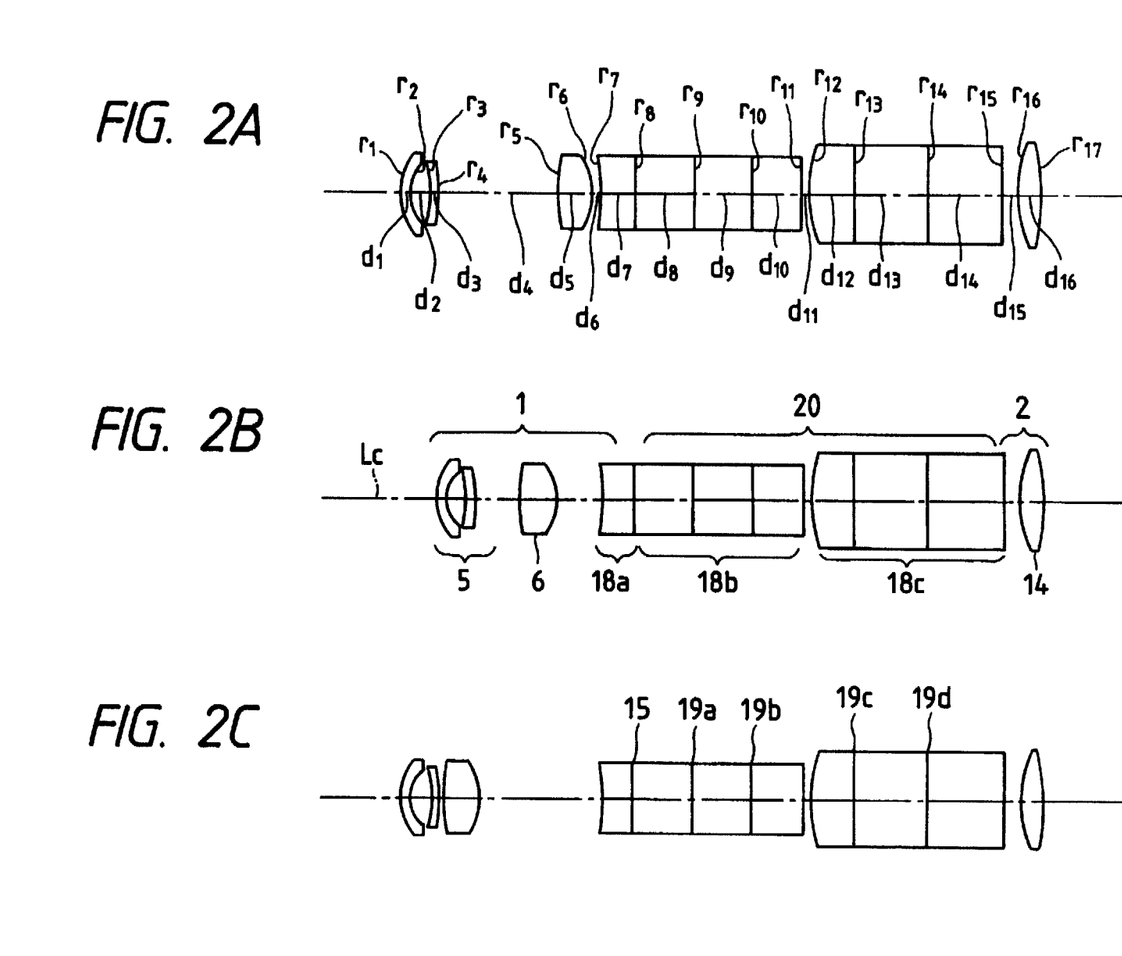
FIGS. 2A, 2B, and 2C are views showing configurations of the optical system of the first embodiment, developed along an optical axis, at low, moderate, and high magnifications, respectively.

FIG. 1 shows the arrangement of the optical system of the first embodiment in the present invention. FIGS. 2A, 2B, and 2C show the configurations of the optical system shown in FIG. 1, developed along the optical axis, at low, moderate, and high magnifications, and have numeral references in common with one another. In these figures, the optical system of the first embodiment comprises an objective system 1, a first prism 18a having a half mirror 15 as optical path splitting means, a reflecting member 20 for erecting an object image, and an eyepiece system 2 for forming an exit pupil from a beam of light leaving the reflecting member 20.

The objective system 1 includes a first lens unit 5 which is movable, composed of two negative lenses and having a negative refracting power as a whole; a second lens unit 6 which is movable, composed of a single positive lens; and a third lens unit having a negative refracting power. Here, the third lens unit is constructed integral with the first prism 18a as an entrance surface thereof with a concave side facing an object. The first prism 18a is provided with the half mirror 15, disposed on a side located closest to the eyepiece system. The half mirror is disposed in which is a finder optical path Lc between the objective system 1 and the eyepiece system 2, and divides the optical path into a transmitting optical path and a reflecting optical path. The transmitting optical path corresponds to the finder optical path, while the reflecting optical path comes to a photometric optical path.

The reflecting member 20 is constructed with a second prism 18b having a first reflecting surface 19a and a second reflecting surface 19b, and a third prism 18c having a third reflecting surface 19c and a fourth reflecting surface 19d. The entrance surface of the second prism 18b is cemented to the half mirror 15 situated at the exit surface for the finder optical path of the first prism 18a. The refractive index of a medium of the second prism 18b is identical with that of a medium of the first prism 18a. A field mask 13 is placed between the second prism 18b and the third prism 18c toward which the entrance surface of the third prism 18c directs its convex side to function as a field lens.

The eyepiece system 2 includes the exit surface of the third prism 18c and a magnifying lens 14 which is biconvex and has a positive power. On the reflecting optical path formed by the half mirror 15, a surface which is bordered, at its mutually opposite edges, by the entrance surface of the first prism 18a and the half mirror 15, is configured as an exit surface 21 for the reflecting optical path. Further, after the exit surface 21, a photometric element 17 is located opposite to the exit surface 21.

Since the optical system of the first embodiment is constructed as mentioned above, the light beam incident on the first prism 18a is split up into two parts: one part for photometry and the other for forming a field image by the half mirror 15 constructed at the interface between the first prism 18a and the second prism 18b. Subsequently, the beam for photometry, reflected by the half mirror 15, after emerging from the first prism 18a, enters the photometric element 17 disposed at the position virtually equivalent to an intermediate imaging plane. On the other hand, the beam for forming the field image, transmitted through the half mirror 15, after being twice-reflected in the second prism 18b and forming an intermediate image on the field mask 13, is further twice-reflected by the third prism 18c to form an erect image and reaches the magnifying lens 14.

The numerical data of the first embodiment are shown below.

Finder magnification=0.40~1.43×

Field angle (2ω)=55.6~15.2°

```
r1 = 8.480
    d1 = 1.20         n1 = 1.58423        υ1 = 30.49
r2 = 5.171 (aspherical)
    d2 = 2.74
r3 = −15.690
    d3 = 1.20         n3 = 1.58423        υ3 = 30.49
r4 = −292.115 (aspherical)
    d4 = 16.69 (low magnification),
         6.28 (moderate magnification),
         0.80 (high magnification)
r5 = 14.540 (aspherical)
    d5 = 5.00         n5 = 1.49241        υ5 = 57.66
r6 = −8.441
    d6 = 1.13 (low magnification),
         6.65 (moderate magnification),
         17.03 (high magnification)
r7 = −49.987 (aspherical)
    d7 = 4.00         n7 = 1.52540        υ7 = 56.25
r8 = ∞ (half mirror)
    d8 = 8.50         n8 = 1.52540        υ8 = 56.25
r9 = ∞ (reflecting surface)
```

-continued

| | | |
|---|---|---|
| d9 = 8.50 | n9 = 1.52540 | ѵ9 = 56.25 |
| r10 = ∞ (reflecting surface) | | |
| d10 = 7.00 | n10 = 1.52540 | ѵ10 = 56.25 |
| r11 = ∞ | | |
| d11 = 1.80 | | |
| r12 = 19.885 | | |
| d12 = 6.00 | n12 = 1.52540 | ѵ12 = 56.25 |
| r13 = ∞ (reflecting surface) | | |
| d13 = 10.00 | n13 = 1.52540 | ѵ13 = 56.25 |
| r14 = ∞ (reflecting surface) | | |
| d14 = 10.50 | n14 = 1.52540 | ѵ14 = 56.25 |
| r15 = ∞ | | |
| d15 = 2.24 | | |
| r16 = 18.507 | | |
| d16 = 2.80 | n16 = 1.49241 | ѵ6 = 57.61 |
| r17 = −23.987 (aspherical) | | |

(Photometric optical path)

| | | |
|---|---|---|
| r8 = ∞ (half mirror) | | |
| d8 = 4.00 | n8 = 1.52540 | ѵ8 = 56.25 |
| r9' = ∞ (exit surface for the reflecting optical path) | | |
| d9' = 13.11 | | |
| r10' (light-receiving surface of the photometric element) | | |

Aspherical coefficients
Second surface
E=0.27118×10$^{-3}$, F=−0.70652×10$^{-5}$
G=0.12213×10$^{-5}$
Fourth surface
E=−0.52069×10$^{-3}$, F=−0.53258×10$^{-5}$,
G=0.38475×10$^{-6}$
Fifth surface
E=−0.57031×10$^{-3}$, F=0.32846×10$^{-5}$,
G=−0.41489×10$^{-6}$
Seventh surface
E=−0.71380×10$^{-4}$, F=0.59607×10$^{-5}$,
G=−0.41489×10$^{-6}$
Seventeenth surface
E=0.72163×10$^{-4}$, F=−0.50443×10$^{-6}$,
G=0.89029×10$^{-8}$ In the numerical data of the embodiment mentioned above, r1, r2, . . . represent radii of curvature of individual lens surfaces; d1, d2, . . . thicknesses of individual lenses or spaces therebetween; n1, n3, . . . refractive indices of individual lenses; and $v_1$, $v_3$, . . . Abbe's numbers of individual lenses.

Also, the configurations of aspherical surfaces in the data are expressed by the following equation using the aspherical coefficients:

$$Z = Y^2/(r + \sqrt{r^2 - Y^2}) + EY^4 + FY^6 + GY^8$$

where Z is the coordinates in the direction of the optical axis, Y is the coordinates in the direction normal to the optical axis, r is the paraxial radius of curvature, and E, F, and G are aspherical coefficients.

Figure 3:
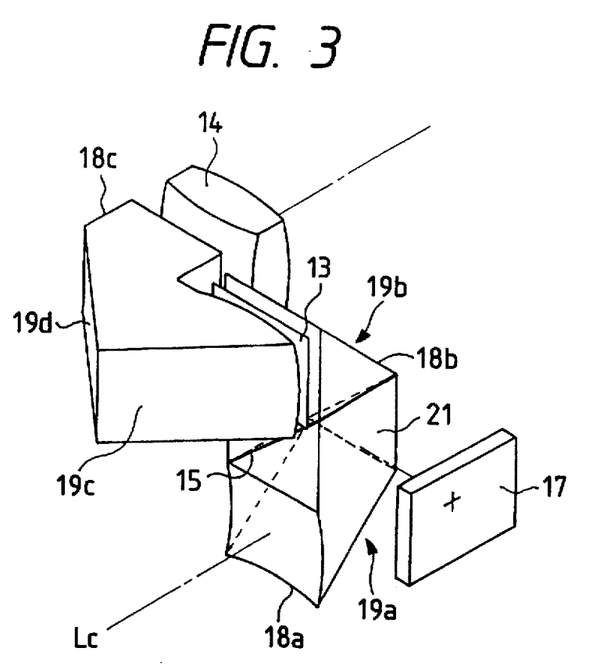
FIG. 3 is a perspective view showing the arrangement of a second embodiment of the present invention.

FIG. 3 shows the arrangement of the optical system of the second embodiment in the present invention. The first and second lens units of the objective system are omitted from the figure because they are constructed such that they are identical with those of the optical system shown in the first embodiment. The third lens unit is formed by the entrance surface of the first prism 18a shaped into a concavity. These lens units constitute the objective system.

In the case of this embodiment, the reflecting member for erecting the object image is constructed with the first prism 18a having the first reflecting surface 19a as a similar reflecting means for erecting the object image, the second prism 18b having the second reflecting surface 19b which is a similar reflecting means, and the third prism 18c having the third and fourth reflecting surfaces 19c and 19d. In this way, a surface of the reflecting member closest to the object, is also used as the third lens unit of the objective system.

The second embodiment employs the half mirror 15 as an optical path splitting means, which is inclined between the exit surface for the finder optical path of the first prism 18a and the entrance surface of the second prism 18b, to produce the reflecting optical path in the direction nearly perpendicular to the optical axis going through the objective system. The eyepiece system is made up of the exit surface of the third prism 18c and the magnifying lens 14 disposed behind it. Further, the field mask 13 is interposed between the second prism 18b and the third prism 18c, and the photometric element 17 is located opposite to the exit surface 21 of the first prism 18a.

Since the optical system of the second embodiment is constructed as mentioned above, a light beam incident on the first prism 18a is reflected once at an angle of 90° upward, as one looks from the object side, and is split into two parts by the half mirror 15 formed at the interface between the first prism 18a and the second prism 18b: one part for photometry and the other for forming the field image. Specifically, the beam for photometry is reflected by the half mirror 15. After emerging from the first prism 18a it is incident on the photometric element 17 disposed at the position nearly equivalent to an intermediate imaging plane. On the other hand, the beam for forming the field image is transmitted through the half mirror 15. After being reflected once in the second prism 18b and forming an intermediate image on the field mask 13, it is further reflected twice by the third prism 18c to form an erect image and it reaches the magnifying lens 14.

The numerical data of the second embodiment are omitted. They are the same as those of the first embodiment except for the construction of the reflecting member and the optical path splitting means.

Figure 4:
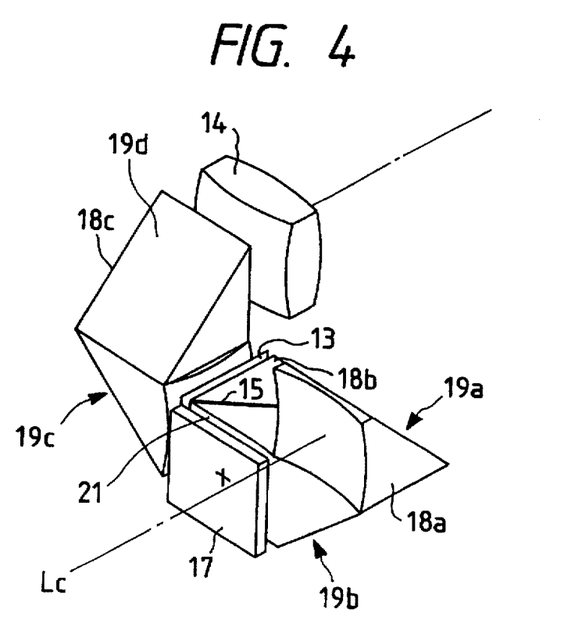
FIG. 4 is a perspective view showing the arrangement of a third embodiment of the present invention.

FIG. 4 depicts the arrangement of the optical system of the third embodiment in the present invention. The first and second lens units of the objective system are omitted from the figure because they are constructed identical to those of the optical system shown in the first embodiment. The third lens unit is formed by the entrance surface of the first prism 18a shaped into a concave form. These lens units constitute the objective system.

In the case of this embodiment, the reflecting member for erecting the object image is constructed with the first prism 18a having the first and second reflecting surfaces 19a and 19b as reflecting means for erecting the object image, the second prism 18b, and the third prism 18c having the third and fourth reflecting surfaces 19c and 19d. In this way, a surface, closest to the object, of the reflecting member is also used as the third lens unit of the objective system.

The half mirror 15 is disposed as the optical path splitting means between the exit surface for the finder optical system of the first prism 18a and the entrance surface of the second prism 18b to produce the reflecting optical path in the direction nearly normal to the optical axis going through the objective system. The eyepiece system is composed of the exit surface of the third lens 18c and the magnifying lens 14 situated behind it. Further, the field-mask 13 is interposed between the second prism 18b and the third prism 18c, and the photometric element 17 is located adjacent to the exit surface 21 of the first prism 18a.

Since the optical system of the third embodiment is designed as mentioned above, a beam of light incident on the first prism 18a is twice-reflected and divided into two parts: one part for photometry and the other for forming the field image by the half mirror 15 placed at the interface between the first prism 18a and the second prism 18b. Specifically, the beam for photometry is reflected by the half mirror 15 and enters the photometric element 17 disposed close to the exit surface 21 of the first prism 18a at the position nearly equivalent to an intermediate imaging plane. On the other hand, the beam for forming the field image is transmitted through the half mirror 15, and after forming an intermediate image on the field mask 13 which is disposed adjacent to the exit surface of the second prism 18b, is twice-reflected by the third prism 18c to form an erect image and arrives at the magnifying lens 14.

Also, the numerical data of the third embodiment are omitted which are the same as those of the first embodiment except for the constructions of the reflecting member and the optical path splitting means.

Figure 5:
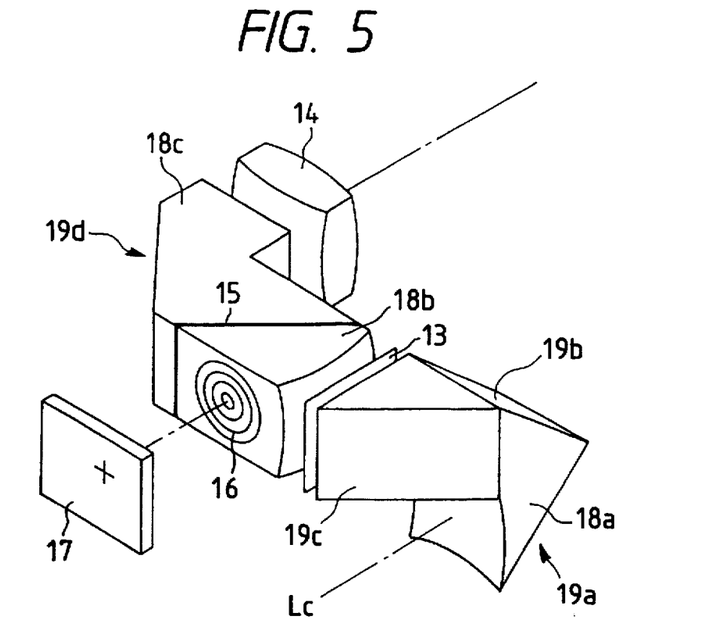
FIG. 5 is a perspective view showing the arrangement of a fourth embodiment of the present invention.

FIG. 5 illustrates the arrangement of the optical system of the fourth embodiment in the present invention. Of the objective system, the first and second lens units are omitted from the figure because they are constructed such that they are identical to those of the optical system shown in the first embodiment, and the third lens unit is formed as the entrance surface of the first prism 18a shaped into a concavity. These lens units constitute the objective system.

In this embodiment, the first prism 18a has the first, second, and third reflecting surfaces 19a, 19b, and 19c as the reflecting means for erecting the object image, and together with the second prism 18b and the third prism 18c having the fourth reflecting surface 19d, forms the reflecting member for erecting the object image. Thus, a surface, closest to the object, of the reflecting member is also used as the third lens unit of the objective system.

The half mirror 15 for the optical path splitting means is disposed between the exit surface for the finder optical path of the second prism 18b and the entrance surface of the third prism 18c to produce the reflecting optical path nearly normal to the optical axis going through the objective system. The eyepiece system is made of the exit surface of the third prism 18c and the magnifying lens 14 situated behind it. Further, the optical system includes the field mask 13 interposed between the first prism 18a and the second prism 18b, a Fresnel lens 16 configured on the exit surface for the reflecting optical path of the second prism 18b, and the photometric element 17 positioned opposite the Fresnel lens 16.

Since the optical system of the fourth embodiment is constructed as described above, a beam of light incident on the first prism 18a is reflected three times and after forming the intermediate image on the field mask 13, enters the second prism 18b. The light beam incident the second prism 18b is split into two parts, one for photometry and the other for forming the field image, by the half mirror 15 configured at the interface between second prism 18b and the third prism 18c. Specifically, the beam for photometry is reflected by the half mirror 15 and is reimaged on the photometric element 17 by the Fresnel lens 16 configured on the exit surface for the reflecting optical path of the second prism 18b. On the other hand, the beam for forming the field image, after being transmitted through the half mirror 15, is reflected once in the third prism 18c to form an erect image and reaches the magnifying lens 14.

Also, the numerical data of the fourth embodiment are omitted which are the same as those of the first embodiment except for the construction of the reflecting member and the optical path splitting means.

Figure 6:
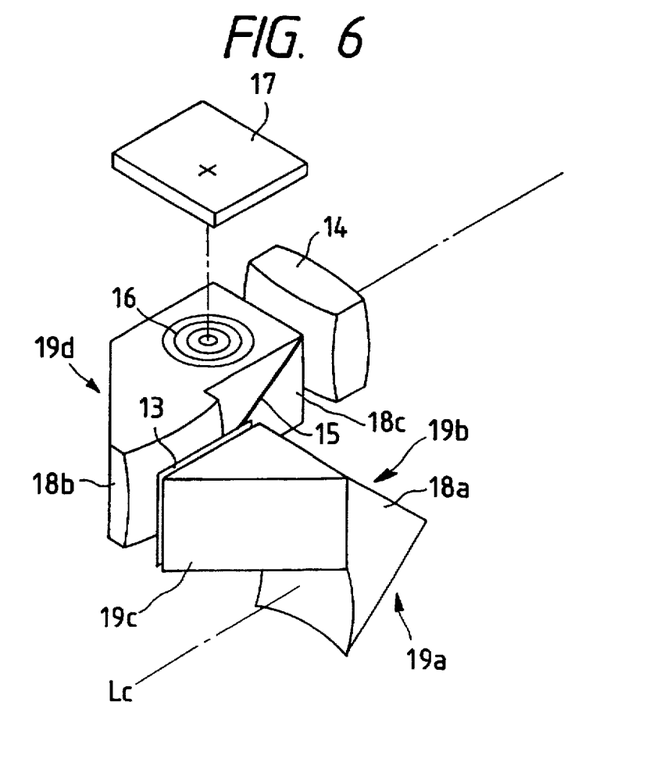
FIG. 6 is a perspective view showing the arrangement of a fifth embodiment of the present invention.

FIG. 6 shows the arrangement of the optical system of the fifth embodiment in the present invention. Of the objective system, the first and second lens units are omitted from the figure because they are constructed such that they are identical to those of the optical system shown in the first embodiment, and the third lens unit is formed as the entrance surface of the first prism 18a shaped into a concave form. These lens units constitute the objective system.

In the case of this embodiment, the first prism 18a has the first, second, and third reflecting surfaces 19a, 19b, and 19c as the reflecting means for erecting the object image, and together with the second prism 18b having the fourth reflecting surface 19d as similar reflecting means, constitutes the reflecting member for erecting the object image. Thus, a surface, closest to the object, of the reflecting member is also used as the third lens unit of the objective system.

The half mirror 15 for the optical path splitting means is disposed between the exit surface for the finder optical path of the second prism 18b and the entrance surface of the third prism 18c to produce the reflecting optical path nearly normal to the optical axis going through the objective system. The eyepiece system is made up of the exit surface of the third prism 18c and the magnifying lens 14 situated behind it. Further, the optical system includes the field mask 13 interposed between the first prism 18a and the second prism 18b, a Fresnel lens 16 configured on the exit surface for the reflecting optical path of the second prism 18b, and the photometric element 17 positioned opposite to the Fresnel lens 16.

Since the optical system of the fifth embodiment is designed as stated above, a beam of light that is incident on the first prism 18a is reflected three times and after forming the intermediate image on the field mask 13 and enters the second prism 18b. The light beam incident on the second prism 18b is further reflected once to form an erect image and then is split into two parts: one part for photometry and the other for forming the field image by the half mirror 15 configured at the interface between the second prism 18b and the third prism 18c. Specifically, the beam for photometry is reflected by the half mirror 15 and is reimaged on the photometric element by the Fresnel lens 16 configured on the exit surface for the reflecting optical path of the second prism 18b. On the other hand, the beam for forming the field image, after being transmitted through the half mirror 15, traverses the third prism 18c and reaches the magnifying lens 14.

Also, the numerical data of the fifth embodiment are omitted which are the same as those of the first embodiment except for the construction of the reflecting member and of the optical path splitting means.

The optical elements of the objective system, eyepiece system, and image-erecting system in each embodiment mentioned above are made from a plastic material so as to reduce the manufacturing cost of the optical system. If high cost is not a problem, the optical elements may be formed from glass.

Figure 7:
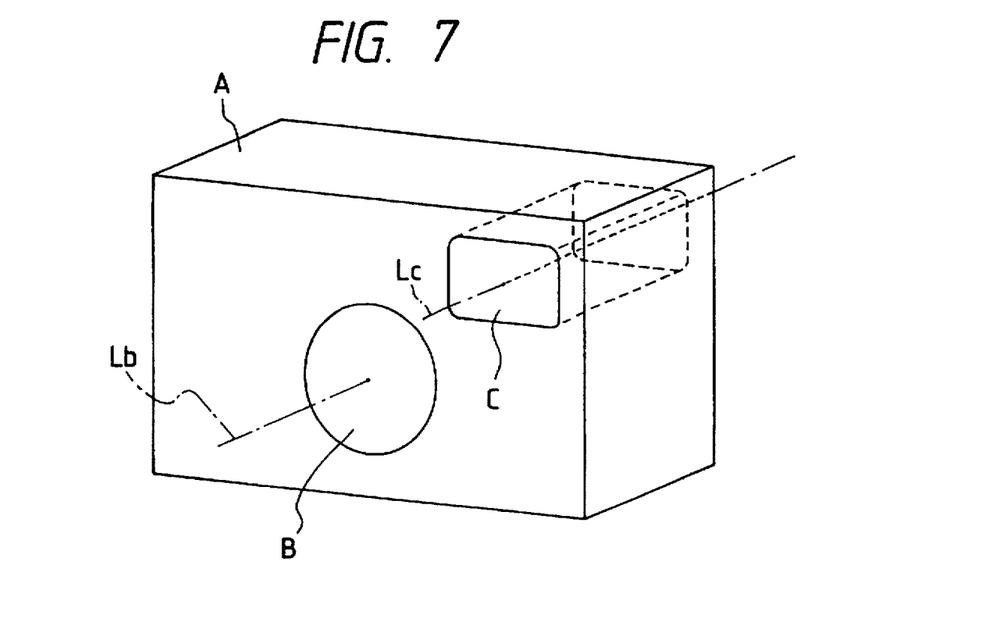
FIG. 7 is a perspective view showing an example of a camera in which the real image mode finder optical system of the present invention is incorporated.
Figure 8:
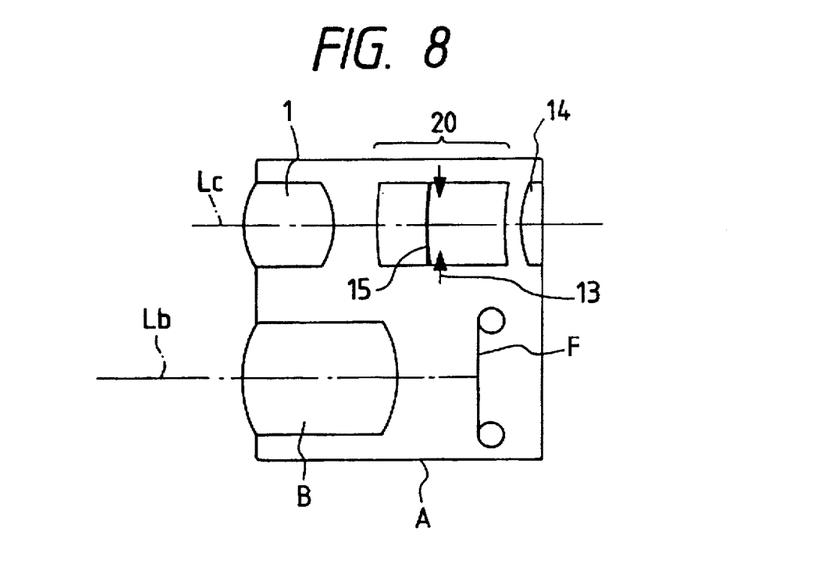
FIG. 8 is an explanatory sectional view showing essential parts of the camera of FIG. 7.

An example where the optical system of each embodiment is incorporated in a camera for photography with silver halide is shown in FIGS. 7 and 8. In a camera A, a photographing optical system B and a finder optical system C are arranged separate from each other. Thus, a photographing optical path Lb reaches a film F, while the finder optical path Lc runs independently so that light transmitted through the optical path splitting means emerges from the eyepiece 14. Most of the cameras having a configuration such as the one shown in FIG. 7 need the length of the optical system to be reduced in its axial direction. For this purpose, it is advisable to adopt the second or third embodiment in which the optical path splitting means is disposed between the first and fourth reflecting surfaces for inverting the image.

Figure 12:
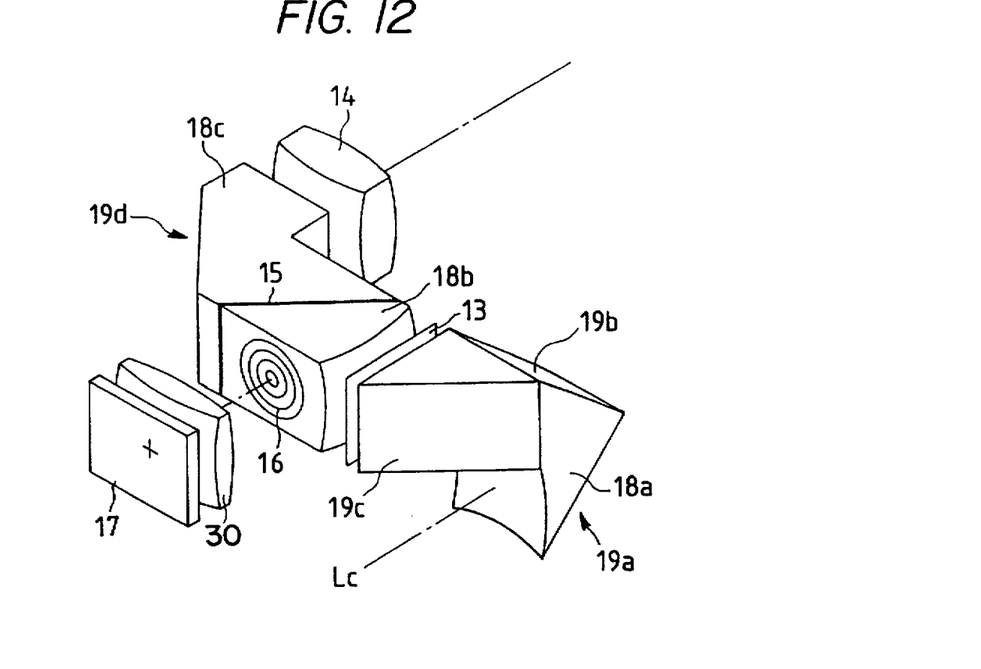
FIG. 12 is a perspective view showing a modification of the FIG. 5 arrangement.
Figure 13:
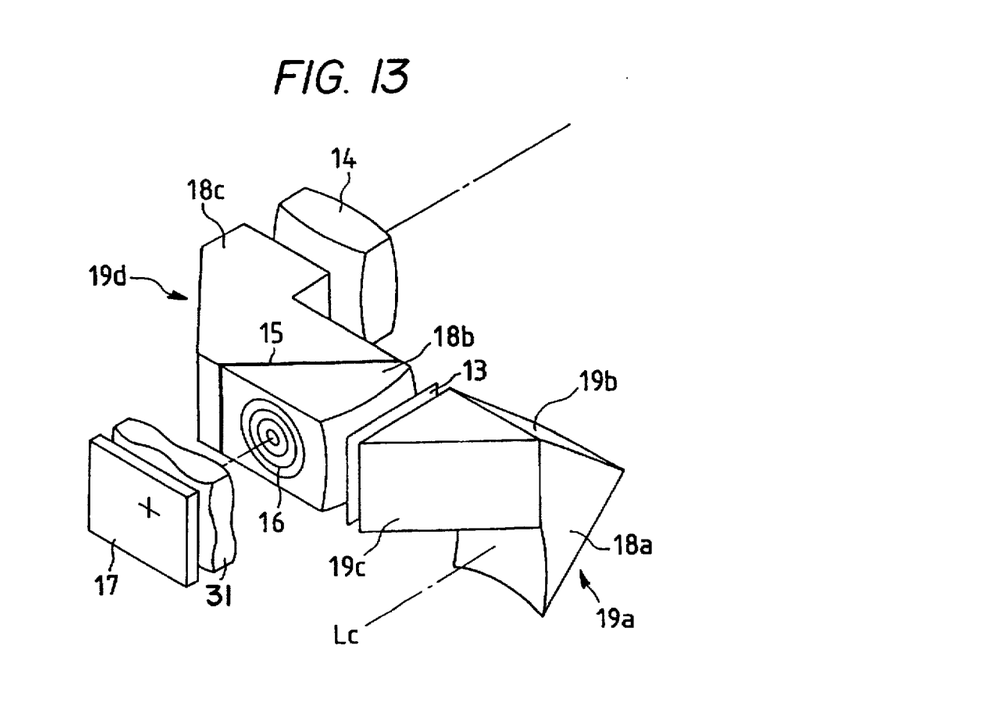
FIG. 13 is a perspective view showing another modification of the FIG. 5 arrangement.

On the other hand, although the intermediate image formed by the objective system in the fourth and fifth embodiments is re-formed on the photometric element by only the Fresnel lens which is configured on the exit surface for the reflecting optical path of the prism, the re-formation of the intermediate image may well be performed by a reimaging optical system using the combination of the Fresnel lens and a single lens (a spherical or aspherical lens), or a single lens. For example, the fifth embodiment can be modified as shown in FIGS. 12, 13, where a spherical lens 30 and an aspherical lens 31 are added as included in the respective reimaging lens systems. In such a case, the advantages of improving imaging performance and of increasing the number of degrees of layout freedom are realized. Furthermore, a proper choice of imaging magnification of the reimaging optical system makes it possible to change the sizes of the intermediate image in the finder and the image re-formed close to the photometric element. Hence, the size of the photometric element can also be arbitrarily chosen.

Where the field frame of the finder varies with the changeover of a photographic field, it is only necessary to employ a method of forming the image of the minimum area of the field frame on the photometric element, or an optical system enabling the reimaging optical system to change the imaging magnification. Whereby, it is possible to change the photometric area in cooperation with the changeovers of the finder field frame and the photographic field. The optical path of the light beam divided for photometry may also be deflected by a reflecting member so that the light beam is incident on the photometric element. In this way, the number of degrees of layout freedom in the camera is further increased.

The objective system used in the present invention is not limited to the variable magnification optical system shown in each embodiment stated above, and may, of course, be constructed as a fixed magnification optical system. Also, although in each embodiment the prism members are used as an image-erecting optical system, mirrors or planar reflecting mirrors may also be used. For the optical path splitting means in the present invention, it is also possible to use a pattern mirror with the exception of the half mirror shown in each embodiment.

Figure 9:
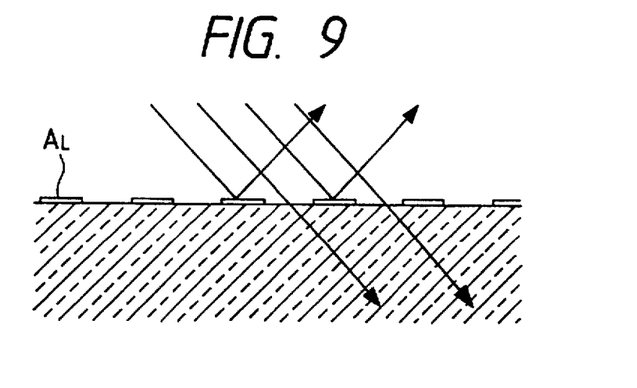
FIG. 9 is an explanatory view showing one example of a coating of optical path splitting means in the optical system of the present invention.
Figure 10:
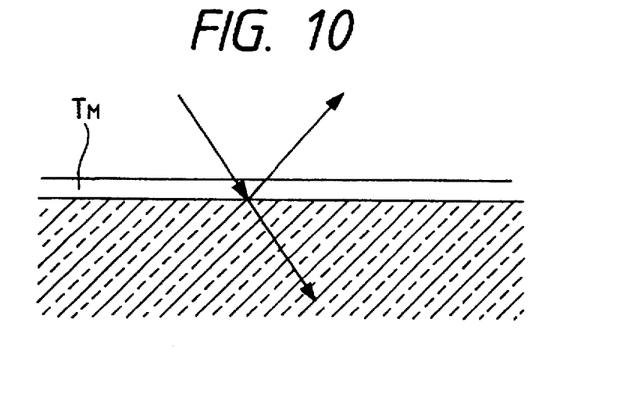
FIG. 10 is an explanatory view showing another example of the coating.
Figure 11:
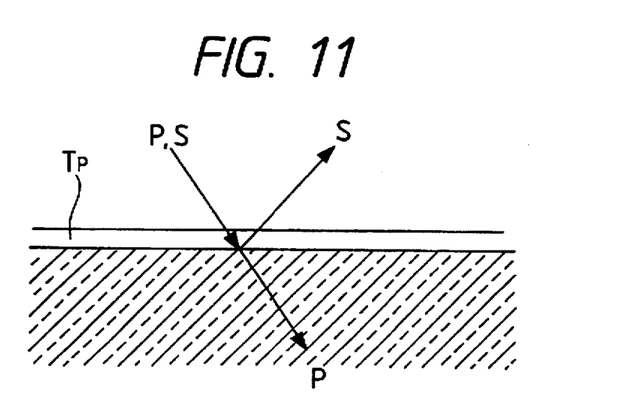
FIG. 11 is an explanatory view showing still another example of the coating.

Although the optical path splitting means may well be designed for an independent part, it would favorably be made of a coating applied to each prism. One type of such a coating is made to divide an entire surface area into respective portions for reflection and transmission of light. To be specific, a basic material such as glass or plastic is preferably coated with a reticulate aluminum film AL that is between approximately several micrometers to 0.1 mm thick, to form a pattern mirror shown in FIG. 9. Thus, the whole reflectance and transmittance are set by the ratio between the areas for reflection and transmission. Further, FIGS. 10 and 11 illustrate techniques of dividing the amount of light into two parts, one for reflection and the other for transmission. These techniques can be realized with comparative ease and with low manufacturing cost. FIG. 10 shows the case where a basic material made of glass or plastic is coated with a semi-transmissive thin film TM. Although, as the semi-transmissive thin film, it is common practice to use a thin film of metal, such as aluminum or chrome, it may well be made in such a way that many layers of thin films of silicon dioxide and magnesium fluoride are combined into a dielectric multilayer film. FIG. 11 shows the case where the basic material is coated with a polarizing semi-transmissive thin film TP. By varying a coating, it is possible that light is selectively divided into the p polarized component and the s polarized component corresponding to transmission and reflection. Also, the prism surface to be coated may well be substituted by a plane-parallel plate.

The type of material used in the optical elements of the objective system, eyepiece system, and image-erecting system forming the finder optical system is an important consideration. This is because most of the materials of glass and plastics, such as polycarbonate resin and polyolefin resin, that are in general use possess spectral properties of reducing the transmittance on the short-wavelength side. Where such optical materials are used in the optical elements of the finder optical system, the field of view which an observer views through the finder will have a yellowish hue. In order to obviate this defect, the transmittance on the short-wavelength side has been increased, or an optical element having a spectral property of reducing the transmittance on the long-wavelength side has been additionally disposed in the finder optical system so that considerable differences in transmittance between wavelengths are decreased as far as possible. Specifically, it is common practice to provide a filter or apply coatings on the optical surfaces of the existing optical components.

The placement of the filter in the finder optical system, however, causes an increase of the number of parts, increases the cost of the system, and is inconsistent with the need for compactness. If coatings are applied on the optical surfaces of the existing optical elements so that the number of parts is not increased, there is the problem of increasing costs required for working the parts. In the present invention, however, these difficulties are solved by arbitrarily setting the spectral property when a coating is applied to the path splitting surface for the optical path splitting means or at least one of the reflecting surfaces for erecting the image. Moreover, such a setting of the spectral property enables the spectral property of the entire finder optical system to be adjusted, for example, for prevention of the coloration. Additionally, when such is applied to the optical path splitting means, it is also possible to adjust the spectral property of the photometric optical system, so that the spectral property is set in accordance with the spectral sensitivity of the photometric element.

What is claimed is:

1. A real image mode finder optical system in which a finder optical path is formed independent of a photographing optical path formed by a photographing optical system, comprising:

an objective system for forming an object image;

an image erecting prism system including a reflecting means, said reflecting means being arranged between an entrance surface and an exit surface of said image erecting prism system for erecting the object image formed by said objective system;

an optical path splitting means for dividing a photometric optical path from the finder optical path by splitting a beam of light emergent from said objective system into a reflected split beam of light and a transmitted split beam of light, said optical path splitting means being disposed such that it is independent of said reflecting means and between said entrance surface and said exit surface of said image erecting prism system;

a photometric means for receiving a split beam of light in the photometric optical path;

an eyepiece system disposed behind said exit surface of said image erecting prism system; and a medium which faces said optical path splitting means on a photometric optical-path side thereof having a refractive index greater than 1 and being shaped as a prism component for introducing the split beam of light in the photometric optical path into said photometric means.

2. A real image mode finder optical system according to claim 1, wherein said reflecting means includes four reflecting surfaces for erecting the object image formed by said objective system.

3. A real image mode finder optical system according to claim 1, wherein said reflecting means included in said image erecting prism system includes a plurality of prism members, each having at least one reflecting surface.

4. A real image mode finder optical system according to claim 3, wherein an intermediate image plane formed by said objective lens is located between said plurality of prism members included in said image erecting prism system.

5. A real image mode finder optical system according to claim 4, wherein a field mask is disposed on the intermediate image plane.

6. A real image mode finder optical system according to claim 1, wherein said optical path splitting means comprises a semi-transmissive thin film formed on a face of said prism component whose refractive index is greater than 1.

7. A real image mode finder optical system according to claim 6, wherein said semi-transmissive thin film comprises a metallic thin film.

8. A real image mode finder optical system according to claim 6, wherein said semi-transmissive thin film comprises a dielectric multilayer film.

9. A real image mode finder optical system according to claim 6, wherein said semi-transmissive thin film comprises a polarizing semi-transmissive thin film.

10. A real image mode finder optical system according to claim 1, wherein said optical path splitting means is disposed between said entrance surface of said image erecting prism system and a first reflecting surface from an object side of said reflecting means.

11. A real image mode finder optical system according to claim 1, wherein the reflected split beam of light is in the photometric optical path introduced to said photometric means via said prism component.

12. A real image mode finder optical system according to any one of claims 1, 2 or 11, wherein said optical path splitting means is disposed between a first reflecting surface from an object side of said reflecting means and a second reflecting surface from the object side of said reflecting means.

13. A real image mode finder optical system according to any one of claims 1 or 11, wherein said optical path splitting means is disposed between a second reflecting surface from an object side of said reflecting means and a third reflecting surface from the object side of said reflecting means.

14. A real image mode optical system according to any one of claims 1 or 11, wherein said optical path splitting means is disposed between a third reflecting surface from an object side of said reflecting means and a fourth reflecting surface which is closest to said eyepiece system of said reflecting means.

15. A real image mode finder optical system according to any one of claims 1 or 11, wherein said optical path splitting means is disposed between a fourth reflecting surface which is closest to said eyepiece system of said reflecting means and said exit surface of said image erecting prism system.

16. A real image mode finder optical system according to any one of claims 1 or 11, wherein a reimaging optical system is disposed in the photometric optical path between said optical path splitting means and said photometric means.

17. A real image mode finder optical system according to claim 16, wherein said reimaging optical system includes a Fresnel lens only.

18. A real image mode finder optical system according to claim 16, wherein said reimaging optical system includes a Fresnel lens and a spherical lens.

19. A real image mode finder optical system according to claim 16, wherein said reimaging optical system includes a Fresnel lens and an aspherical lens.

* * * * *